(12) United States Patent
Sha

(10) Patent No.: US 9,965,054 B2
(45) Date of Patent: May 8, 2018

(54) ACTIVE PEN FOR TOUCH DISPLAY SCREEN, TOUCH DISPLAY SCREEN AND TOUCH CONTROL INPUT SYSTEM

(71) Applicants: BOE TECHNOLOGY GROUP CO., LTD., Beijing (CN); Hefei Xinsheng Optoelectronics Technology Co., Ltd., Anhui (CN)

(72) Inventor: Jin Sha, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 1 day.

(21) Appl. No.: 14/802,101

(22) Filed: Jul. 17, 2015

(65) Prior Publication Data

US 2016/0188012 A1 Jun. 30, 2016

(30) Foreign Application Priority Data

Dec. 30, 2014 (CN) .......................... 2014 1 0850556

(51) Int. Cl.
*G06F 3/0354* (2013.01)
(52) U.S. Cl.
CPC ................. *G06F 3/03545* (2013.01)
(58) Field of Classification Search
CPC ............. G06F 3/03542; G06F 3/03545; G06F 3/0321; G06K 7/10
See application file for complete search history.

(56) References Cited

U.S. PATENT DOCUMENTS 5,877,459 A * 3/1999 Prater ..................... G06F 3/044
178/19.01
6,377,249 B1 * 4/2002 Mumford ............ G06F 3/03545
178/18.01
(Continued)

FOREIGN PATENT DOCUMENTS

CN 1690939 11/2005
CN 101206550 6/2008
(Continued)

OTHER PUBLICATIONS

Office Action from China Application No. 201410850556.X dated Dec. 20, 2016.
(Continued)

*Primary Examiner* — Abbas I Abdulselam
(74) *Attorney, Agent, or Firm* — Calfee, Halter & Griswold LLP

(57) ABSTRACT

The present disclosure discloses an active pen for a touch display screen, a touch display screen and a touch control input system, to improve human-machine interaction accuracy of operating the touch display screen with the active pen by a user. The active pen for the touch display screen comprises a transparent elastic pen point, an optical receiver and an excitation signal emitting apparatus, wherein the contact area between the transparent elastic pen point and the touch display screen is increased with an increase in an operating force, the optical receiver is configured to receive detection light which comes from the touch display screen and penetrates through the transparent elastic pen point, meanwhile, the excitation signal emitting apparatus is in signal connection with the optical receiver, so as to emit an excitation signal of a corresponding intensity to the touch display screen in accordance with the intensity of the detection light received by the optical receiver.

7 Claims, 2 Drawing Sheets

(56) References Cited

U.S. PATENT DOCUMENTS

| | | | |
|---|---|---|---|
| 9,213,443 B2* | 12/2015 | Goertz | G06F 3/0421 |
| 2008/0001078 A1* | 1/2008 | Pittel | G06F 1/3203 |
| | | | 250/252.1 |
| 2008/0007540 A1 | 1/2008 | Ostergaard | |
| 2010/0238138 A1 | 9/2010 | Goertz et al. | |
| 2012/0262411 A1* | 10/2012 | Ahn | G06F 3/0416 |
| | | | 345/174 |
| 2013/0087695 A1* | 4/2013 | Pedersen | G01V 8/14 |
| | | | 250/227.31 |
| 2013/0265265 A1 | 10/2013 | Stern | |
| 2014/0098058 A1* | 4/2014 | Baharav | G06F 3/0421 |
| | | | 345/174 |
| 2014/0362054 A1* | 12/2014 | Matsuki | G06F 3/0321 |
| | | | 345/175 |

FOREIGN PATENT DOCUMENTS

| | | |
|---|---|---|
| CN | 102087565 | 6/2011 |
| CN | 102893185 | 1/2013 |
| CN | 102893185 A | 1/2013 |
| CN | 102968198 | 3/2013 |
| CN | 202815751 | 3/2013 |
| CN | 203012671 | 6/2013 |
| CN | 103425351 | 12/2013 |
| CN | 103838444 | 6/2014 |

OTHER PUBLICATIONS

Second Office Action from Chinese Application No. 201410850556.X dated Jul. 3, 2017.
Third Office Action from Chinese Application No. 201410850556.X dated Dec. 4, 2017.

\* cited by examiner ary of the Invention

ACTIVE PEN FOR TOUCH DISPLAY SCREEN, TOUCH DISPLAY SCREEN AND TOUCH CONTROL INPUT SYSTEM

RELATED APPLICATIONS

This application claims the priority of Chinese Patent Application No. 201410850556.X field on Dec. 30, 2014, which is incorporated by reference herein in its entirety.

TECHNICAL FIELD

The present disclosure relates to the technical field of touch control, and particularly relates to an active pen for a touch display screen, a touch display screen and a touch control input system.

BACKGROUND

With development of touch control technology, more and more mobile terminals perform a human-machine interaction in a touch control manner. Besides finger contact, the touch display screen may use touch pen contact to perform operations.

A touch pen comprises a passive pen and an active pen. The passive pen is functionally equivalent to a finger. When using the passive pen to contact the touch display screen, one small fraction of current will flow into the passive pen from the touch display screen via a touch point, which is equivalent to a change in an electrode capacitance at the touch point. A control chip of the touch display screen may determine the position of the touch point by detecting the change in the electrode capacitance at the touch point. Generally, the nib of the passive pen is designed to be relatively large. In contrast, the active pen may emit an excitation signal to change an electric field at the touch point, thereby changing the electrode capacitance at the touch point. The control chip of the touch display screen may determine the position of the touch point by detecting the change in the electrode capacitance at the touch point. The nib of the active pen may be designed to be relatively small.

One technical drawback of an existing active pen is that it may not sense the operating force of a user, thereby possibly causing a great deviation between operation inputs of the user and display outputs of the touch display screen, thus resulting in relatively low accuracy of the human-machine interaction. For example, when a user writes words with the existing active pen, handwritings displayed by the touch display screen are consistent in weights, this largely deviates from actual input handwritings of the user, thereby causing poor writing effect and being adverse to finger-writing recognition.

SUMMARY OF THE INVENTION

An objective of an embodiment of the present disclosure is to provide an active pen for a touch display screen, a touch display screen and a touch control input system, to improve human-machine interaction accuracy when a user operates the touch display screen with the active pen.

The active pen for the touch display screen, provided by an embodiment of the present disclosure, comprises a transparent elastic pen point, an optical receiver and an excitation signal emitting apparatus, wherein the contact area between the transparent elastic pen point and the touch display screen is increased with an increase in an operating force;

the optical receiver is configured to receive detection light which comes from the touch display screen and penetrates through the transparent elastic pen point; and the excitation signal emitting apparatus is in signal connection with the optical receiver, so as to emit an excitation signal of a corresponding intensity to the touch display screen in accordance with the intensity of the detection light received by the optical receiver.

In a technical solution of an embodiment of the present disclosure, a plurality of detection light emitters are arranged at at least one side edge of the transparent cover plate of the touch display screen. Detection light emitted by the plurality of detection light emitters enters into the transparent cover plate, and is totally reflected between an upper surface and a lower surface of the transparent cover plate. When using the active pen to contact the touch display screen, an optical behavior of the detection light at a contact position changes, wherein one fraction of detection light exits the upper surface of the transparent cover plate and enters into the transparent elastic pen point, thereby being received by the optical receiver. Because the contact area between the transparent elastic pen point and the touch display screen changes with a change in an operating force, and the amount of the detection light entering into the transparent elastic pen point changes with a change in this contact area, the intensity of the detection light received by the optical receiver changes with the change in the operating force. An excitation signal of a corresponding intensity is emitted to the touch display screen in accordance with the intensity of the detection light received by the optical receiver, so that the touch display screen displays handwritings more truly. In comparison with the prior art, human-machine interaction accuracy of operating the touch display screen with the active pen is greatly improved.

In an embodiment, a head portion of the transparent elastic pen point has a cambered surface, or, the head portion of the transparent elastic pen point is semi-spherical. In this way, the contact area between the transparent elastic pen point and the touch display screen may uniformly change with the change in the operating force, facilitating to further improve the writing accuracy.

In an embodiment, the detection light comprises infrared ray, ultraviolet ray or far infrared ray.

In an embodiment, the transparent elastic pen point is a PET transparent elastic pen point, especially a PET transparent elastic pen point with high transmissivity and better wear resistance.

An embodiment of the present disclosure further provides a touch display screen, comprising a transparent cover plate, wherein a plurality of detection light emitters are arranged at at least one side edge of the transparent cover plate, detection light emitted by the plurality of detection light emitters enters into the transparent cover plate, and an angle α between the detection light entering into the transparent cover plate and a normal to the transparent cover plate surface satisfies:

$$\arcsin(1/n) \leq \alpha < \arcsin(c/n)$$

wherein n represents the refractive index of the transparent cover plate, and c represents the refractive index of the transparent elastic pen point of the active pen.

When using the active pen to contact the touch display screen, an optical behavior of the detection light at a contact position changes, wherein one fraction of detection light exits an upper surface of the transparent cover plate and enters into the transparent elastic pen point, thereby being received by the optical receiver. Because the contact area between the transparent elastic pen point and the touch display screen changes with a change in an operating force, and the amount of the detection light entering into the transparent elastic pen point changes with a change in this contact area, the intensity of the detection light received by the optical receiver changes with the change in the operating force. An excitation signal of a corresponding intensity is emitted to the touch display screen in accordance with the intensity of the detection light received by the optical receiver, so that the touch display screen displays handwritings more truly. In comparison with the prior art, human-machine interaction accuracy of operating the touch display screen with the active pen is greatly improved.

In an embodiment, the detection light emitters are embedded in the transparent cover plate.

In an embodiment, the detection light comprises infrared ray, ultraviolet ray or far infrared ray.

In an embodiment, the plurality of detection light emitters are uniformly distributed along the side edge of the transparent cover plate.

In an embodiment, the touch display screen is an embedded type touch display screen or an external-mounting type touch display screen.

An embodiment of the present disclosure further provides a touch control input system, comprising a touch display screen and an active pen, wherein the active pen comprises a transparent elastic pen point, an optical receiver and an excitation signal emitting apparatus, the contact area between the transparent elastic pen point and the touch display screen is increased with an increase in an operating force, the optical receiver is configured to receive detection light which comes from the touch display screen and penetrates through the transparent elastic pen point, and the excitation signal emitting apparatus is in signal connection with the optical receiver, so as to emit an excitation signal of a corresponding intensity to the touch display screen in accordance with the intensity of the detection light received by the optical receiver; and the touch display screen comprises a transparent cover plate, a plurality of detection light emitters are arranged at at least one side edge of the transparent cover plate, detection light emitted by the plurality of detection light emitters enters into the transparent cover plate, and an angle α between the detection light entering into the transparent cover plate and a normal to the transparent cover plate surface satisfies:

$$\arcsin(1/n) \leq \alpha < \arcsin(c/n)$$

wherein n represents the refractive index of the transparent cover plate, and c represents the refractive index of the transparent elastic pen point of the active pen.

When a user uses the touch control input system provided by the embodiment, human-machine interaction accuracy of operating the touch display screen with the active pen is relatively high.

LIST OF REFERENCE NUMERALS

100—active pen
21—transparent cover plate
22—detection light emitter
23—detection light
10—pen holder
11—transparent elastic pen point
12—optical receiver
13—excitation signal emitting apparatus

DETAILED DESCRIPTION OF THE INVENTION

To improve human-machine interaction accuracy of operating a touch display screen with an active pen by a user, an embodiment of the present disclosure provides an active pen for a touch display screen, a touch display screen and a touch control input system. In a technical solution of the present disclosure, a plurality of detection light emitters are arranged at at least one side edge of the transparent cover plate of the touch display screen. Detection light emitted by the plurality of detection light emitters enters into the transparent cover plate, and an angle between the detection light entering into the transparent cover plate and a normal to the transparent cover plate surface satisfies such a condition that the detection light is totally reflected between an upper surface and a lower surface of the transparent cover plate. When using the active pen to contact the touch display screen, an optical behavior of the detection light at a contact position changes, wherein one fraction of detection light exits the upper surface of the transparent cover plate and enters into the transparent elastic pen point, thereby being received by the optical receiver. Because the contact area between the transparent elastic pen point and the touch display screen changes with a change in an operating force, and the amount of the detection light entering into the transparent elastic pen point changes with a change in this contact area, the intensity of the detection light received by the optical receiver changes with the change in the operating force. An excitation signal of a corresponding intensity is emitted to the touch display screen in accordance with the intensity of the detection light received by the optical receiver, so that the touch display screen displays handwritings more truly.

To make an objective, a technical solution and advantages of the present disclosure more clear, the present disclosure will be further described in detail with reference to the following embodiment.

Figure 1:
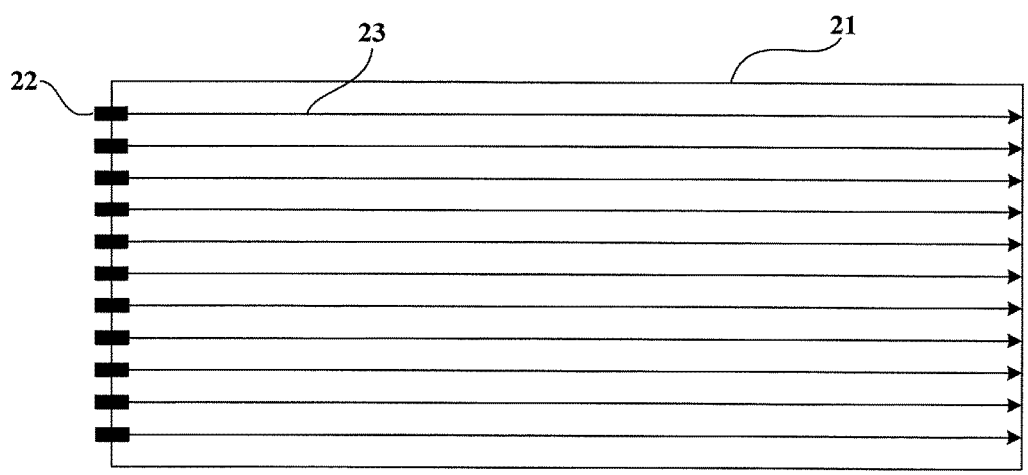
FIG. 1 is a schematic top view of a structure of a transparent cover plate in an embodiment of the present disclosure.
Figure 2:
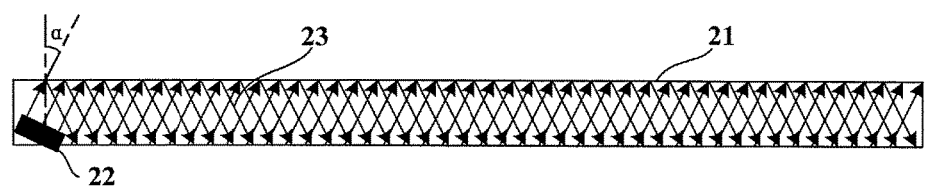
FIG. 2 is a schematic cross-sectional view of a structure of a transparent cover plate in an embodiment of the present disclosure.

As shown in FIGS. 1 and 2, an embodiment of the present disclosure provides a touch display screen, comprising a transparent cover plate 21, wherein a plurality of detection light emitters 22 are arranged at at least one side edge of the transparent cover plate 21, detection light 23 emitted by the plurality of detection light emitters 22 enters into the transparent cover plate 21, and an angle α between the detection light entering into the transparent cover plate 21 and a normal to the transparent cover plate 21 surface satisfies:

$$\arcsin(1/n) \leq \alpha < \arcsin(c/n)$$

wherein n represents the refractive index of the transparent cover plate, c represents the refractive index of the transparent elastic pen point of the active pen, and the refractive index of air is 1.

There is no particular requirement for a specific type of touch display screen, which, for example, may be an embedded type touch display screen, or may be further an external-mounting type touch display screen. In the embedded type touch display screen, a drive electrode wire and a detection electrode wire which are used for realizing touch control functions are arranged on a substrate of the display screen. In the external-mounting type touch display screen, a touch screen and a display screen are separately fabricated and then fit together. Regardless of what type of touch display screens, the transparent cover plates 21 (generally made of glass) configured to be in touch contact with the active pen may be all designed to be a structure shown in FIG. 1. There is no particular requirement for a specific type of detection light 23, which may employ invisible light, for example infrared ray, ultraviolet ray or far infrared light. Here, the detection light may be infrared ray with less radiation to human body.

The detection light emitters 22 may be distributed along one side edge of the transparent cover plate 21, may also be distributed along two opposite or intersecting side edges of the transparent cover plate, may be further distributed along any three side edges, or the detection light emitters are arranged at four side edges of the transparent cover plate. Here, there is no special requirement for an arrangement pattern of the detection light emitters, as long as the detection light can be spread throughout a touch region of the transparent cover plate after continuous reflections. In an embodiment, the plurality of detection light emitters 22 are uniformly distributed along the side edge of the transparent cover plate 21. In this way, in the touch region of the transparent cover plate 21, the detection light 23 is more uniformly distributed, facilitating to improve the accuracy of detecting a touch point. There is no requirement for a specific mounting pattern of the detection light emitters 22. With reference to FIG. 2, in one embodiment of the present disclosure, the detection light emitters 22 are embedded in the transparent cover plate 21.

In a case where light enters into an optically thinner medium from an optically denser medium, when an incidence angle is increased to such an angle that a refraction angle reach 90°, refracted light will completely disappear, thus remaining only the reflected light. Such phenomenon is called total reflection. When the transparent elastic pen point of the active pen is not in contact with the transparent cover plate 21, the condition for totally reflecting the detection light in the transparent cover plate medium is as follows: $\alpha \geq \arcsin(1/n)$; when the transparent elastic pen point of the active pen is in contact with the transparent cover plate 21, the condition that the detection light may exit the transparent cover plate and enter into the transparent elastic pen point is as follows: $\alpha < \arcsin(c/n)$. Therefore, according to a technical solution of the present disclosure, an angle $\alpha$ between the detection light entering into the transparent cover plate 21 and a normal to the transparent cover plate 21 surface should be set within a range of $\arcsin(1/n) \geq \alpha < \arcsin(c/n)$.

Figure 4A:
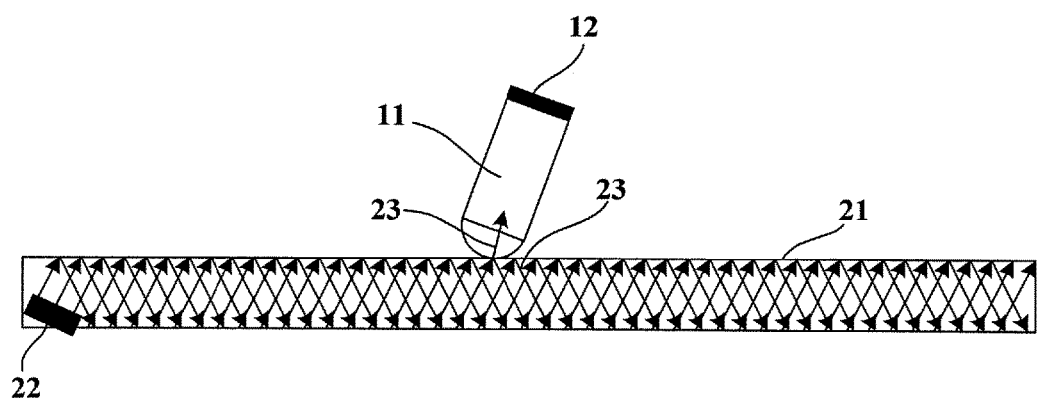
FIG. 4a is a schematic view of propagation of detection light when an active pen is in slight contact with the transparent cover plate.
Figure 4B:
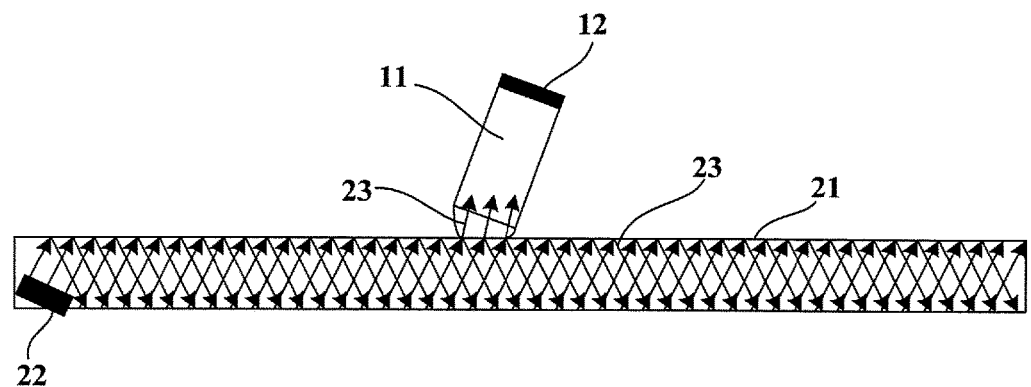
FIG. 4b is a schematic view of propagation of detection light when an active pen is in relatively forceful contact with the transparent cover plate.

As shown in FIG. 2, when the active pen is not in contact with the touch display screen, the detection light 23 is totally reflected between the upper surface and the lower surface of the transparent cover plate 21, thereby spreading throughout the touch region of the transparent cover plate 21. At this moment, the detection light 23 may not be refracted from the upper surface or lower surface of the transparent cover plate 21, so that the light usage is relatively high. As shown in FIGS. 4a and 4b, when the active pen is in contact with the transparent cover plate 21, because an optical behavior of the detection light 23 at a contact position changes, one fraction of detection light 23 exits the upper surface of the transparent cover plate 21 and enters into the transparent elastic pen point 11.

Figure 3:
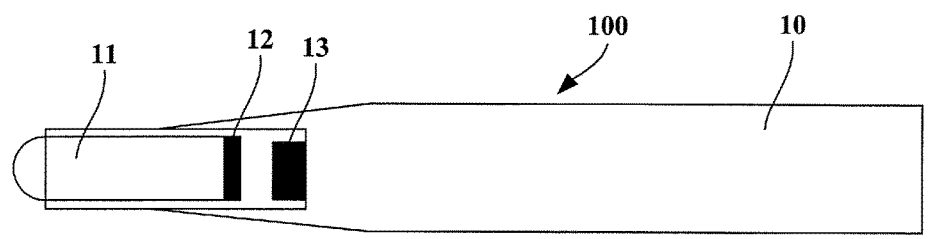
FIG. 3 is a schematic structural view of an active pen provided by an embodiment of the present disclosure.

As shown in FIG. 3, an embodiment of the present disclosure further provides an active pen 100 used in connection with the above touch display screen, which comprises a transparent elastic pen point 11, an optical receiver 12 and an excitation signal emitting apparatus 13, wherein the contact area between the transparent elastic pen point 11 and the touch display screen changes with a change in an operating force;

the optical receiver 12 is configured to receive the detection light which comes from the touch display screen and penetrates through the transparent elastic pen point 11; and the excitation signal emitting apparatus 13 is in signal connection with the optical receiver 12, so as to emit an excitation signal of a corresponding intensity to the touch display screen in accordance with the intensity of the detection light received by the optical receiver 12.

The transparent elastic pen point 11, the optical receiver 12 and the excitation signal emitting apparatus 13 of the active pen 100 may be all designed in a pen holder 10 of the active pen 100. There is no particular requirement for a specific shape of the transparent elastic pen point. In one structure of an embodiment of the present disclosure, a head portion of the transparent elastic pen point 11 is semispherical, as shown in FIG. 3. In another structure of an embodiment of the present disclosure, the head portion of the transparent elastic pen point has a cambered surface. The contact area between the transparent elastic pen point 11 and the touch display screen (that is, the contact area between the transparent elastic pen point 11 and the transparent cover plate 21) may uniformly change with the change in the operating force, facilitating to further improve writing accuracy. Because the pen point of the active pen 100 may frequently rub the transparent cover plate 21 of the touch display screen during writing, the transparent elastic pen point 11 may be a PET transparent elastic pen point with high transmissivity and better wear resistance.

The optical receiver 12 is configured to receive the detection light which comes from the touch display screen and penetrates through the transparent elastic pen point 11. The optical receiver 12 may be arranged at the root portion of the transparent elastic pen point 11, or may be further arranged in the middle of the transparent elastic pen point 11. The optical receiver 12 may comprise an analog-digital conversion module, which is configured to convert an analog signal of the received detection light into an electrical signal.

The excitation signal emitting apparatus 13 may specifically comprise a control module and an excitation signal emitting head, wherein the control module is configured to determine the intensity of an excitation signal emitted to the touch display screen in accordance with the intensity of the detection light received by the optical receiver 12 and control the excitation signal emitting head to emit an excitation signal of this intensity to the touch display screen.

As shown in FIGS. 4a and 4b, when using the active pen to contact the transparent cover plate 21 of the touch display screen, an optical behavior of the detection light 23 at a contact position changes, wherein one fraction of detection light 23 exits the upper surface of the transparent cover plate 21 and enters into the transparent elastic pen point 11 (that is, is refracted), thereby being received by the optical receiver 12. Because the contact area between the transparent elastic pen point 11 and the touch display screen changes with the change in the operating force, and the amount of the detection light entering into the transparent elastic pen point changes with a change in this contact area, the intensity of the detection light received by the optical receiver 12 changes with the change in the operating force. As shown in FIG. 4*a*, when the operating force of writing by the user is relatively small, the deformation of the transparent elastic pen point 11 is relatively small, and the contact area with the touch display screen is also relatively small, so that the intensity of the detection light received by the optical receiver 12 is relatively weak. As shown in FIG. 4*b*, when the operating force of the writing by the user is relatively large, the deformation of the transparent elastic pen point 11 is relatively large, and the contact area with the touch display screen is also relatively large, so that the intensity of the detection light received by the optical receiver 12 is relatively strong. An excitation signal of a corresponding intensity is emitted to the touch display screen in accordance with the intensity of the detection light received by the optical receiver 12. The excitation signal may change an electric field at the touch point, thereby changing an electrode capacitance at the touch point. A control chip of the touch display screen may distinguish the operating force of the user at the touch point by detecting the change in the electrode capacitance at the touch point, thereby making the screen display handwritings which are relatively consistent to an input force of the user, so that better writing effect and higher finger-writing recognition are realized. In comparison with the prior art, human-machine interaction accuracy of operating the touch display screen with the active pen is greatly improved.

An embodiment of the present disclosure further provides a touch control input system, which comprises a touch display screen and an active pen, wherein the active pen comprises a transparent elastic pen point, an optical receiver and an excitation signal emitting apparatus, the contact area between the transparent elastic pen point and the touch display screen is increased with an increase in an operating force, the optical receiver is configured to receive detection light which comes from the touch display screen and penetrates through the transparent elastic pen point, and the excitation signal emitting apparatus is in signal connection with the optical receiver, so as to emit an excitation signal of a corresponding intensity to the touch display screen in accordance with the intensity of the detection light received by the optical receiver; and the touch display screen comprises a transparent cover plate, a plurality of detection light emitters are arranged at at least one side edge of the transparent cover plate, detection light emitted by the plurality of detection light emitters enters into the transparent cover plate, and an angle α between the detection light entering into the transparent cover plate and a normal to the transparent cover plate surface satisfies:

$$\arcsin(1/n) \leq \alpha < \arcsin(c/n)$$

wherein n represents the refractive index of the transparent cover plate, and c represents the refractive index of the transparent elastic pen point of the active pen.

When a user uses the touch control input system provided by the embodiment, human-machine interaction accuracy of operating the touch display screen with the active pen is relatively high.

It will be apparent to those skilled in the art that various modifications and alterations can be made to the present disclosure without departing from the scope and spirit of the present disclosure. It is intended that the present disclosure covers the modifications and variations as they come within the scope of the appended claims and their equivalents.

The invention claimed is:

1. A touch display screen comprising:
   a transparent cover plate having a surface; and
   a plurality of detection light emitters arranged on at least one side edge of the transparent cover plate;
   wherein detection light emitted by the detection light emitters enters the transparent cover plate at an angle based on the refractive index of the transparent cover plate and the refractive index of a transparent elastic pen point of an active pen for use with the touch display screen; and
   wherein the detection light emitters are embedded in the transparent cover plate.

2. The touch display screen according to claim 1, wherein the detection light is selected from the group consisting of infrared light, ultraviolet light, and far-infrared light.

3. The touch display screen according to claim 2, wherein the plurality of detection light emitters are uniformly distributed along the at least one side edge of the transparent cover plate.

4. The touch display screen according to claim 3, wherein said touch display screen is an embedded type touch display screen or an external-mounting type touch display screen.

5. The touch display screen according to claim 1, wherein the plurality of detection light emitters are uniformly distributed along the at least one side edge of the transparent cover plate.

6. The touch display screen according to claim 5, wherein said touch display screen is an embedded type touch display screen or an external-mounting type touch display screen.

7. A touch control input system comprising:
   a touch display screen comprising:
      a transparent cover plate having a surface; and
      a plurality of detection light emitters arranged on at least one side edge of the transparent cover plate;
      wherein detection light emitted by the detection light emitters enters the transparent cover plate at an angle based on the refractive index of the transparent cover plate and the refractive index of a transparent elastic pen point of an active pen for use with the touch display screen;
      wherein the detection light emitters are embedded in the transparent cover plate; and
   an active pen comprising:
      a transparent elastic pen point;
      an optical receiver; and
      an excitation signal emitting apparatus;
   wherein the contact area between the transparent elastic pen point and the touch display screen is increased with an increase in an operating force;
   wherein the optical receiver is configured to receive detection light from the touch display screen passing through the transparent elastic pen point; and
   wherein the excitation signal emitting apparatus emits an excitation signal with an intensity corresponding to an intensity of the detection light received by the optical receiver, the excitation signal being configured to change an capacitance at a touch point between said transparent elastic pen point and said touch display screen.

* * * * *